(12) United States Patent
Butler et al.

(10) Patent No.: US 7,306,814 B2
(45) Date of Patent: Dec. 11, 2007

(54) METHOD OF GROWING CRYSTALS

(75) Inventors: Michael Francis Butler, Sharnbrook (GB); Mary Heppenstall-Butler, Sharnbrook (GB); Christopher Rawlins, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 155 days.

(21) Appl. No.: 11/124,892

(22) Filed: May 9, 2005

(65) Prior Publication Data

US 2005/0282012 A1 Dec. 22, 2005

(30) Foreign Application Priority Data

Jun. 18, 2004 (EP) .................................. 04253647

(51) Int. Cl.
- *A61K 9/14* (2006.01)
- *A61K 33/06* (2006.01)
- *A61K 33/10* (2006.01)

(52) U.S. Cl. ...................... 424/489; 424/682; 424/686; 424/715

(58) Field of Classification Search ................ 424/489, 424/678, 679, 680, 681, 682, 686, 715
See application file for complete search history.

(56) References Cited

U.S. PATENT DOCUMENTS

| | | | |
|---|---|---|---|
| 4,954,381 A | 9/1990 | Cabasso et al. | |
| 5,631,013 A | 5/1997 | Bergmann et al. | |
| 6,413,749 B1 * | 7/2002 | Becker et al. | ............. 435/187 |
| 2002/0034514 A1 | 3/2002 | Rivera | |

FOREIGN PATENT DOCUMENTS

| | | |
|---|---|---|
| JP | 55153709 | * 11/1980 |
| WO | 03/064514 | 8/2002 |

OTHER PUBLICATIONS

Lewis, Sr., J., Hawley's Condensed Chemical Dictionary, 1997, John Wiley & Sons, Inc., 3th Edition, pp. 1016-1017.*
European Search Report No. EP 04 25 3647 dated Nov. 12, 2004—2 pp.
International Search Report No. PCT/EP2005/004732 dated Jul. 11, 2005.

* cited by examiner

*Primary Examiner*—Johann R. Richter
*Assistant Examiner*—Konata M. George
(74) *Attorney, Agent, or Firm*—Michael P. Aronson

(57) ABSTRACT

A composition is provided comprising a substance of interest encapsulated by a continuous layer of a plurality of salt crystals which layer is impermeable to the substance of interest. Also provided is a method of producing a continuous layer of a plurality of salt crystals, the salt comprising a cation and an anion, which method comprises
(i) providing a substrate which comprises a plurality of negatively charged binding sites for the cation and/or a plurality of positively charged binding sites for the anion, and
(ii) contacting the substrate with a solution of the salt under conditions which cause nucleation of salt crystals comprising the cation and the anion at a plurality of said binding sites,
the plurality of charged binding sites being present on the surface of the substrate at a sufficient density so that the resulting plurality of salt crystals form a continuous layer.

13 Claims, 2 Drawing Sheets

30μm

10μm

3μm

Fig.2A. 0.2% sodium alginate, 20% ascorbic acid
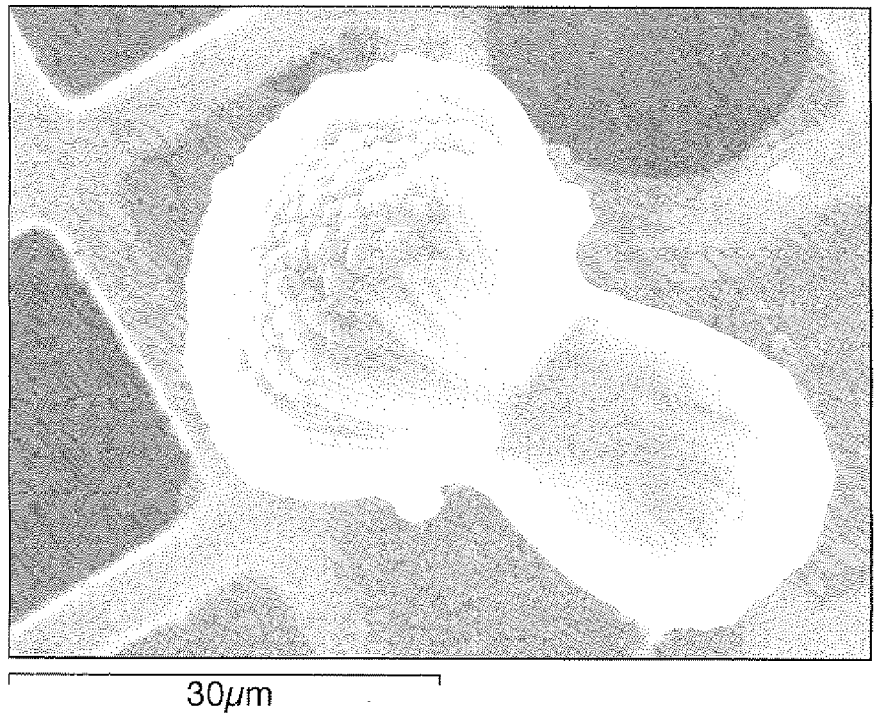
30μm
Fig.2B. Close up of shell
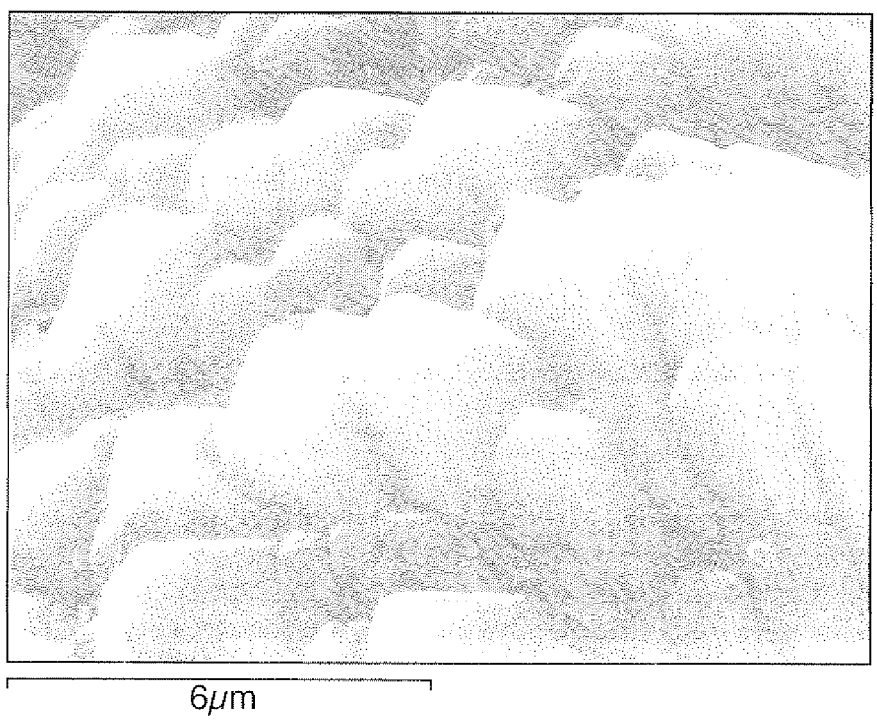
6μm

METHOD OF GROWING CRYSTALS

The present invention relates to compositions comprising a substance of interest encapsulated by a continuous layer of a plurality of salt crystals, which layer is impermeable to the substance of interest. Also provided is a method for providing impermeable layers of salt crystals.

BACKGROUND TO THE INVENTION

Many orally administered active substances, such as pharmaceutical drugs and nutritional supplements are unpalatable and/or need to be protected from the environment prior to delivery to the gut. A variety of techniques have been developed previously to alleviate this problem. For example, many tablets have coatings. However, applying coatings to solid dosage forms is an expensive process. An alternative approach to encapsulating active molecules is the use of liposomes and the like. However, liposomes tend to be 'leaky' leading to loss of the active substance, especially low molecule weight substances.

SUMMARY OF THE INVENTION

We have developed a method for growing impermeable capsules of salt crystals by templating crystal growth on a substrate. By selecting a suitable substrate with charged binding sites for the salt ions, crystals can be nucleated at a sufficient density on the surface of the substrate to form a continuous, impermeable layer. The capsules are impermeable to low molecular weight active substances, such as ascorbic acid. This methodology can be applied using any suitable substrate configuration to generate impermeable crystal layers of the desired geometry.

Accordingly, the present invention provides a method of producing a continuous layer of a plurality of salt crystals, the salt comprising a cation and an anion which method comprises
(i) providing a substrate which comprises a plurality of negatively charged binding sites for the cation and/or a plurality of positively charged binding sites for the anion, and
(ii) contacting the substrate with a solution of the salt under conditions which cause nucleation of salt crystals comprising the cation and the anion at a plurality of said binding sites,
the plurality of charged binding sites being present on the surface of the substrate at a sufficient density so that the resulting plurality of salt crystals form a continuous layer.

Preferably, the average spacing between the binding sites is substantially equivalent to the spacing between the ions in at least one of the lattice planes of the salt crystals.

In a preferred embodiment, the substrate comprises a plurality of suspended particles. Preferably, the substrate further comprises a substance of interest, such as a pharmacologically active substance, a foodstuff, a dietary supplement, a fragrance molecule, a biocidal agent and/or a skin active agent.

Preferably, the continuous layer is substantially impermeable to a molecule having a molecular mass of from 100 to 1000 g/mol.

In a related aspect, the present invention provides a continuous layer of a plurality of salt crystals obtained by the method of the invention.

The present invention also provides a composition comprising a substance of interest encapsulated by a continuous layer of a plurality of salt crystals, which layer is substantially impermeable to the substance of interest.

In a preferred embodiment, the composition is obtained/obtainable by a method comprising
(i) providing a substrate comprising a plurality of suspended particles, which substrate has a plurality of negatively charged binding sites for a cation of the salt and/or a plurality of positively charges binding sites for an anion of the salt, and comprises the substance of interest; and
(ii) contacting the substrate with a solution of the salt under conditions which cause nucleation of the salt crystals comprising the cation and the anion at a plurality of said binding sites,
the plurality of charged binding sites being present on the surface of the substrate at a sufficient density so that the resulting plurality of salt crystals form a continuous layer.

Preferably the substrate is a gelled polymer. Preferably the salt dissolves at acid pH.

In a preferred embodiment, the substance of interest is a pharmacologically active substance, a foodstuff, a dietary supplement, a fragrance molecule, a biocidal agent and/or a skin active agent.

The present invention also provides a pharmaceutical composition comprising a composition of the invention, wherein the substance of interest is a pharmacologically active substance, together with a pharmaceutically compatible carrier or diluent.

The present invention further provides a cosmetic composition comprising a composition of the invention, wherein the substance of interest is a fragrance molecule, a biocidal agent and/or a skin active agent, together with a cosmetically compatible carrier or diluent.

In addition, the present invention provides a foodstuff comprising a composition of the invention.

Preferably in said pharmaceutical compositions, foodstuffs and/or cosmetic compositions, the composition of the invention is present at from 0.1 to 90 wt %, more preferably at from 1 to 50 wt %, most preferably at least 5 wt %.

DETAILED DESCRIPTION OF THE INVENTION

Unless defined otherwise, all technical and scientific terms used herein have the same meaning as commonly understood by one of ordinary skill in the art.

The substrate which is to serve as a template for growth of the continuous crystal layer can be of any desired geometry. It is preferred that the substrate is three-dimensional such that the crystal layer can form over the entire surface and encapsulate the substrate e.g. the substrate can be substantially spherical. The substrate is typically a solid or gel.

In a preferred embodiment, the substrate is provided as a suspension of particles, such as gelled polymer particles. The substrate may be formed in situ, i.e. in solution, from soluble materials e.g. by precipitation, crystallisation or gelling and the like.

The substrate comprises charged binding sites for a cation and/or an anion of the salt which is it desired to grow on the substrate. These binding sites will be positively or negatively charged depending on whether they are to bind anion or cations, respectively. Examples of binding sites include basic groups and acidic groups. Specific examples include hydroxyl groups, amines and carboxylates.

Substrates may be charged throughout, or predominantly on the surface. For example, an uncharged substrate may be coated with a charged compound to form a suitable substrate for use in the method of the invention.

Substrates should have a sufficient density of charged binding sites to ensure that salt crystals will be nucleated at a sufficient density that the resulting crystals will contact each other/overlap so as to form a continuous, impermeable layer. Typically, this can be achieved where the average spacing between the binding sites is less than 10 times the spacing between the ions in at least one plane of the crystal lattice, preferably less than 5 times. For example, the average spacing between binding sites is typically less than 5 nm.

Preferred substrates include polymers, particularly gelling polymers. It is especially preferred to use gelling biopolymers such as pectin, carrageenan and sodium alginate.

In one embodiment, the substrate comprises a substance of interest. Consequently, when the crystal layer forms around the substrate, the substance of interest is encapsulated within the layer. Examples of substances of interest include pharmacologically active substances, nutritional supplements such as vitamins, antioxidants and other micronutrients, other foodstuffs, fragrance molecules and other cosmetic ingredients that it is desired to apply to the skin, antibacterial/biocidal agents, and other skin active agents.

In another embodiment, the substrate is the substance of interest. For example, we have found that polyphenols such as epigallocatechin gallate (EGCg) can be encapsulated with calcium carbonate following crystallisation of the EGCg from solution. Where the substance of interest is the substrate, the substance of interest is typically dissolved in a suitable solvent to form a metastably saturated solution prior to the addition of the ions required to form the crystal layer. The substance of interest should preferably be of sufficient polarity to complex with the cation or anion of the added salt to form a crystal, e.g. having hydroxyl groups and ester groups to complex with $Ca^{2+}$.

In another embodiment, the substrate is not the substance of interest.

The method of the invention involves contacting the substrate with a solution comprising the ions of the salt that it is desired to crystallise under conditions that cause nucleation of salt crystals containing those ions. It will be appreciated that there are a variety of methods for crystallising salts from a solution. For example, placing the substrate in a supersaturated solution of the salt, with the substrate providing nucleation sites, will result in crystal growth. Alternatively, a supersaturated solution can be generated after the substrate has been contacted with/immersed in the solution. This can be achieved by, for example, initiating a chemical reaction or by changing the conditions such that further salt is dissolved e.g. by a change in pH or temperature. Other methods include a double decomposition reaction where two soluble salts are mixed to form an insoluble salt of interest.

It is generally preferred to wash the resulting crystal layers, such as encapsulates, several times, for example at least three times, with solvent, to remove excess reactants and/or unincorporated substances of interest.

The resulting crystals layers may optionally be dried, e.g. by freeze drying.

Consequently, in the context of the present invention, 'a solution of the salt' means a solution containing the ions of the salt which it is desired to crystallise on the substrate, or precursors thereof. Thus, for example, the bicarbonate ion is a precursor of the carbonate ion since the action of alkali on the bicarbonate leads to the formation of carbonate. The ions of the salt which it is desired to crystallise on the substrate may only exist transiently in solution prior to crystallisation, or may initially be dissolved in solution in combination with a different anion/cation. A particular example of this is given in example 1 where a calcium chloride solution (source of calcium ions) is combined with a solution of sodium bicarbonate (bicarbonate being a precursor of carbonate) which is then treated with NaOH to induce supersaturation of calcium carbonate which is the salt which crystallises on the substrate.

Where the substrate is provided as a gelling polymer, addition of ions to the solution may be used to gel the polymer. For example, calcium ions gel pectin and alginate whereas sodium ions gel kappa-carrageenan.

Preferred cations are group I and group II metal ions, such as sodium, potassium, magnesium, or calcium ions, as well as transition metal ions. Preferred anions are carbonate, phosphate and sulphate ions. The most preferred anion is the carbonate ion.

In one embodiment, the salt is soluble at gastric pH and/or the pH of human sweat, but is insoluble at neutral pH and above. Layers and encapsulates formed of such a salt will therefore disintegrate when they reach the stomach or are applied to sweaty areas of the skin but will remain intact at higher pH. Such salts include salts such as carbonates that undergo a chemical reaction in the presence of acids, and not just those that simply dissolve.

The resulting crystal layer can be formed from a single salt, or from a mixture of salts. Where the substrate is the substance of interest, it is envisaged that in some cases the impermeable crystal layer can also comprise the salt form of the substrate. For example, if the cation is calcium and the anion is carbonate and the substrate of interest [X] is capable of forming a calcium salt then the crystal layer can comprise both calcium carbonate and the calcium salt of [X].

In a preferred embodiment, the crystals formed are food grade and/or pharmaceutically acceptable.

When encapsulating substances of interest that are sensitive to oxidation and/or degradation/inactivation, it is preferred to take one or more of the following precautions during the encapsulation process, and after where applicable.

Remove oxygen from all fluids and equipment and add soluble antioxidant to the solvent and holding solution.

Keep the entire process in a pH and chemical window where precipitated salts are insoluble and the ingredients do not degrade.

Remove the precipitate (resulting particle encapsulates) from the solvent, repeatedly wash and agitate to remove inter-particle chemicals.

Store the precipitate in conditions where the salt is highly insoluble.

The continuous layer of a plurality of crystals, such as a layer formed by the method of the invention, is characterised in that it is substantially impermeable to low molecular weight molecules, such as molecules having a molecular mass of from 100 to 1000 g/mol. This results from the plurality of crystals forming close contacts with each other, and in many cases overlapping, to form a continuous sintered structure. This can be achieved using the method of the invention because the binding sites on the substrate direct nucleation of many crystals at a high density.

Preferably, the degree of impermeability of the crystal layers of the invention is such that when a substance of interest having a molecular mass of from 100 to 1000 g/mol is encapsulated within such a layer, which substance of interest is water-soluble and does not bind irreversibly to the layer, and then the resulting capsules are incubated in water for seven days, at least 90%, more preferably 95%, most preferably 97, 98 or 99% of the substance is interest is retained within the capsule.

A suitable test for impermeability can be conducted as follows: encapsulate a substance of interest within the crystal layer that is it desired to test and then wash the resulting particles in water at least three times to remove excess substance of interest coating the outside of the particles. The particles are then divided into two batches. The first is placed in water for 7 days. The second is ruptured, chemically or physically (typically chemically, such as by adding acid), in a given volume of water as the first batch, any residual debris removed, by centrifugation for example, and the amount of released substance of interest determined. After 7 days, the first batch is washed at least three times, resuspending in the same volume of water, the particles ruptured and the amount of released substance of interest determined. The % impermeability can then be determined by dividing the amount of substance of interest released from the first batch by the amount of substance of interest released from the second batch and multiplying the result by 100.

Crystal growth and morphology can optionally be modified by the presence in the solution of growth modifiers. These include low molecular weight organic acids such as tartaric acid, ascorbic acid, galacturonic acid (which produce hexagonal prisms with calcium carbonate), fumaric acid, malic acid, aspartic acid and sorbic acid (which produce scalenohedra with calcium carbonate). Preferred growth modifiers are food grade and/or pharmaceutical grade.

The method of the invention can, for example, be used to encapsulate one or more substances of interest in an impermeable layer of salt crystals to form particles.

In one embodiment, the substance of interest is water soluble and/or has a molecular mass of from 100 to 1000 g/mol.

Preferably encapsulates comprise at least 1 μg, more preferably at least 10 or 100 μg of the substance of interest per mg of crystallised salt present in the encapsulates.

There are a variety of uses for such particles. For example, they can be used to deliver pharmacologically active substances to humans or animals via an oral route. The salt should be selected so that it will dissolve/decompose in the pH of the stomach but not in the higher pH of the mouth or oesophagus. The particles will typically be combined with a pharmaceutically compatible carrier or diluent to produce a pharmaceutical composition. Such carriers and diluents are well known in the art. The particles can be formulated as solid, liquid or gel dosage forms.

Similarly, the particles can be used to deliver dietary supplements such as vitamins (e.g. vitamin C), antioxidants such as polyphenols (e.g. epigallocatechin gallate (EGCg)) and other micronutrients. Again, the particles can be formulated as solid, liquid or gel dosage forms.

The particles can also be incorporated into foodstuffs.

In these cases, encapsulation of the substance of interest will allow the taste to be masked and can also protect sensitive active substances from oxidation etc.

In another embodiment, the particles can be used to deliver substances of interest to the skin of an individual. The salt should be selected such that it dissolves/decomposes in contact with sweat. Substances of interest will include fragrance molecules and other cosmetic ingredients that it is desired to apply to the skin, antibacterial/biocidal agents, and other skin active agents.

The particles will typically be combined with a cosmetically/dermatologically acceptable carrier to form a product suitable for topical application. Such carriers are well known in the art. The topical compositions may be made into a wide variety of product types. These include, but are not limited to lotions, creams, gels, sticks, sprays, ointments and pastes. These product types may comprise several types of carrier systems including, but not limited to solutions, emulsions, gels and solids.

The present invention will now be described further with reference to the following examples which are illustrative only and non-limiting.

DESCRIPTION OF THE FIGURES

FIG. 2 shows electron micrographs of encapsulates of the present invention.

EXAMPLE 1

5 ml of 0.01 M calcium chloride ($CaCl_2$) solution was added to 5 ml 0.2% (w/w) biopolymer solution in 0.02 M sodium bicarbonate ($NaHCO_3$) whilst being stirred using a magnetic follower. Biopolymers used include low methoxy pectin, high methoxy pectin, kappa-carrageenan and sodium alginate.

The ions present in solution immediately gel or thicken the biopolymer. Calcium ions gel pectin and alginate whereas sodium ions gel kappa-carrageenan.

The pH was increased to 10.5 using 1 M sodium hydroxide (NaOH). This induces supersaturation of calcium carbonate ($CaCO_3$) and leads to the nucleation of calcium carbonate, after a time delay of up to several tens of minutes, on the biopolymer gel previously formed. A crystalline shell composed of many distinct crystals of $CaCO_3$ is thereby grown on the gel template. The nucleation rate and growth rate of $CaCO_3$, and therefore the thickness of the crystalline shell, is moderated by the biopolymer and the relative concentrations of the ingredients.

Figure 1A:
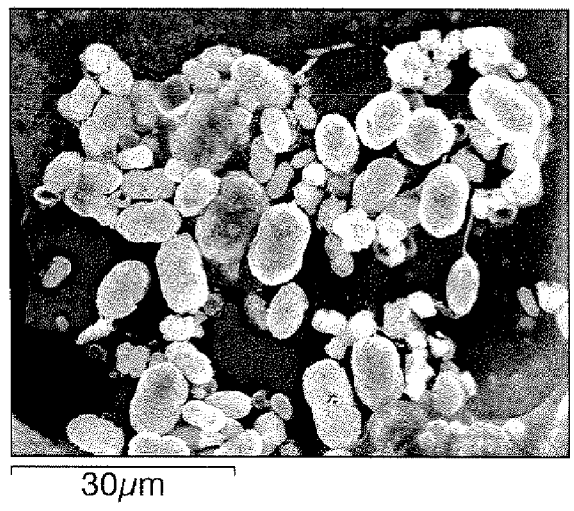
FIG. 1 shows electron micrographs of encapsulates of the present invention. A: substrate is high methoxy pectin. B: substrate is low methoxy pectin. C: substrate is kappa-caraageenan.
Figure 1B:
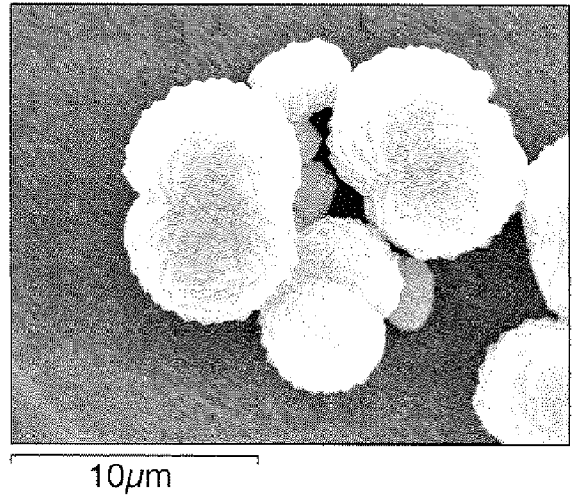
Figure 1C:
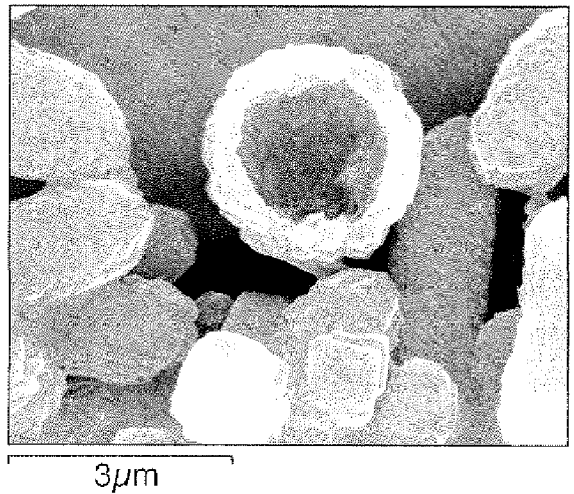

The solution was stored at 4° C. to slow bacterial growth. The samples were left a minimum of three days before washing with 0.1 M NaOH, staining and imaging. Examples of the crystalline shells and capsules are shown in FIG. 1. In the third panel, the capsules have been subjected to high pressures causing some of the spheres to rupture. The hollow nature of the spheres is readily apparent.

EXAMPLE 2

5 ml of 0.01 M calcium chloride, ($CaCl_2$) solution was added to 5 ml 0.2% (w/w) sodium alginate and 20% (w/w) ascorbic acid solution in 0.02 M sodium bicarbonate ($NaHCO_3$) whilst being stirred using a magnetic follower. The ions present in solution immediately gelled the sodium alginate.

The pH was increased to 10.5 using 1 M sodium hydroxide (NaOH). This induces supersaturation of calcium carbonate ($CaCO_3$) and leads to the nucleation of calcium carbonate, after a time delay of up to several tens of minutes, on the biopolymer gel previously formed. A crystalline shell composed of many distinct crystals of $CaCO_3$ is thereby grown on the gel template. The crystal morphology of the $CaCO_3$ shell was determined by the nucleation of crystals on the sodium alginate template and the growth modification effect of the ascorbic acid in solution, leading to long $CaCO_3$ crystals with an octahedral tip being grown from the alginate particles.

The samples were left a minimum of three days before washing with 0.1 M NaOH, staining and imaging. Examples of the crystalline shells and capsules are shown in FIG. 2.

Discussion

Calcium carbonate (or other salt) is nucleated in the presence of a template containing acidic (e.g. carboxylic acid) or basic (e.g. amine) groups with bound cations or anions from the salt, when the solution exceeds a certain degree of supersaturation. This can be achieved by the formation of calcium carbonate (or other salt) via a chemical reaction or by the dissolution of additional calcium carbonate (or other salt) via a pH change for example.

The presence of calcium, carbonate or appropriate cations or anions in the substrate form preferential sites for crystal growth since they will act as regions of increased supersaturation and thereby behave like crystal nuclei.

The average spacing of the acidic or basic groups is believed to strongly influence, or even determine, the crystal habit of the calcium carbonate crystals that are formed on the polymer gel substrate. For example, the spacing of carboxylic acid groups in poly(acrylic acid) in solution is 0.503 nm, which corresponds to the spacing of calcium atoms in the (110) crystal plane that is expressed when calcium carbonate is grown in the presence of poly(acrylic acid). For the biopolymer systems used in the present case, 0.503 nm will be the minimum spacing of the acid groups and in some cases it will be considerably greater.

EXAMPLE 3

Substance of Interest as the Substrate

An Optimised Procedure is as Follows:

Make a metastably saturated solution of the substance(s) of interest, the substance(s) of interest being of sufficient polarity to complex with the cation or anion of the added salt to form a crystal, e.g. having hydroxyl groups and ester groups to complex with $Ca^{2+}$.

Remove oxygen from all fluids and equipment and add soluble antioxidant to the solvent and holding solution.

To the solution with the substance of interest in it, during stirring, add a highly supersaturated solution of ions of the salt intended to provide the encapsulating continuous layer.

Keep the entire process in a pH and chemical window where precipitated salts are insoluble and the ingredients do not degrade. Remove the precipitate from the solvent, repeatedly wash and agitate to remove interparticle chemicals.

Store the precipitate in conditions where the salt is highly insoluble and the active is not prone to degradation.

The above process was performed, separately, with green tea powder, theaflavin mixtures or purified Epigallocatechin gallate (EGCg).

60 to 90% of the esterified elements of green tea powder with L-ascorbic acid as antioxidant were precipitated with calcium carbonate on addition of molar calcium chloride and sufficient sodium carbonate to neutralise the mix. The precipitate, after three washes, was stable when left in nitrogen purged deionised water with calcium ascorbate as antioxidant. All liquids and equipment were nitrogen purged.

In the case of green tea powder, analysis of the encapsulated material demonstrated good encapsulation of gallated catechins. Typical loading capacity was 600-800 mg EGCg in 600 mg calcium.

In the case of theaflavin mixtures, good encapsulation of theaflavins was observed, with gallated theaflavins being preferentially encapsulated, due to the presence of the gallate moiety which contains a polar ester group which complexes with calcium ions.

The various features and embodiments of the present invention, referred to in individual sections above apply, as appropriate, to other sections, mutatis mutandis. Consequently features specified in one section may be combined with features specified in other sections, as appropriate.

Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A method of producing a continuous layer of a plurality of crystals of a salt, designated the encapsulating salt, said encapsulating salt comprising a cation and an anion which method comprises
    (i) forming an aqueous suspension of particles of a substrate and the cation of the encapsulating salt, wherein said cation is dissolved in water in combination with a different anion from the anion of the encapsulating salt and wherein said substrate comprises a plurality of binding sites for the cation and/or the anion of the encapsulating salt;
    (ii) precipitating the encapsulating salt to form a plurality of crystals in the aqueous suspension by introducing the anion of the encapsulating salt in combination with a different cation from the cation of the encapsulating salt;
wherein the plurality of charged binding sites being present on the surface of the substrate is at a sufficient density so that the resulting plurality of salt crystals form a continuous layer.

2. A method according to claim 1 wherein there is a spacing between the anion and cation binding sites on the substrate that is equivalent to the spacing of at least one lattice plane of the encapsulating salt crystals.

3. A method according to claim 1 wherein the substrate comprises a plurality of suspended particles.

4. A method according to claim 1 wherein the substrate is a gelled polymer.

5. A method according to claim 1 wherein the encapsulating salt dissolves at acid pH.

6. A method according to claim 1 wherein the cation is selected from a group I metal ion and a group II metal ion.

7. A method according to claim 1 wherein the anion is selected from phosphate, carbonate and sulphate.

8. A method according to claim 1 wherein the substrate further comprises a substance of interest wherein the substance of interest is selected from pharmacologically active substances, nutritional supplements, vitamins, antioxidants, other micronutrients, other foodstuffs, fragrance molecules, cosmetic ingredients that is desired to be applied to the skin, antibacterial/biocidal agents and other skin active agents.

9. A method according to claim 1 wherein the layer is impermeable to a molecule having a molecular mass of from 100 to 1000 g/mol.

10. A method according to claim 4 wherein the gelled polymer is selected from the group consisting of pectin, carrageenan and sodium alginate.

11. A method according to claim 8 wherein the substance of interest is selected from the group consisting of green tea, *Epigallocatechin gallate* and theoflavin.

12. A method according to claim 1 wherein the encapsulating salt comprise a carbonate anion.

13. A method according to claim 1 wherein the encapsulating salt is calcium carbonate.

* * * * *